United States Patent [19]

Lewis

[11] Patent Number: 4,676,543
[45] Date of Patent: Jun. 30, 1987

[54] TRUCK RACK

[76] Inventor: Delmous Lewis, 73450 Irontree Dr., Palm Desert, Calif. 92260

[21] Appl. No.: 871,801

[22] Filed: Jun. 9, 1986

[51] Int. Cl.⁴ ............................................. B60D 3/00
[52] U.S. Cl. ...................................... 296/3; 403/171; 403/389
[58] Field of Search .......... 296/3; 224/42.43, 42.42 R; 403/389, 391, 171, 205, 176, 172, 403

[56] References Cited

U.S. PATENT DOCUMENTS

| | | | |
|---|---|---|---|
| 4,057,281 | 11/1977 | Garrett | 296/3 |
| 4,211,448 | 7/1980 | Weston | 296/3 |
| 4,509,787 | 4/1985 | Knaack et al. | 296/3 |
| 4,600,232 | 7/1986 | Phillips | 296/3 |

FOREIGN PATENT DOCUMENTS 377521  3/1964  Switzerland .................. 403/389

Primary Examiner—Robert R. Song
Attorney, Agent, or Firm—I. Louis Wolk

[57] ABSTRACT

A rack for installation upon a truck body such as that of a pick-up truck or the like, in which upright supporting legs are installed adjacent to each corner of the truck body and a rack assembly is mounted upon said legs by means of unitary brackets having channels for engagement with the legs, lower elongated rails and cross braces, and in which upper rails are vertically spaced from and mounted upon the lower rails by means of spacing brackets having open channels in which the upper and lower rails are secured and in which the rails may be divided into separate segments which are joined together end to end within the channels of an intermediate spacing bracket.

4 Claims, 12 Drawing Figures

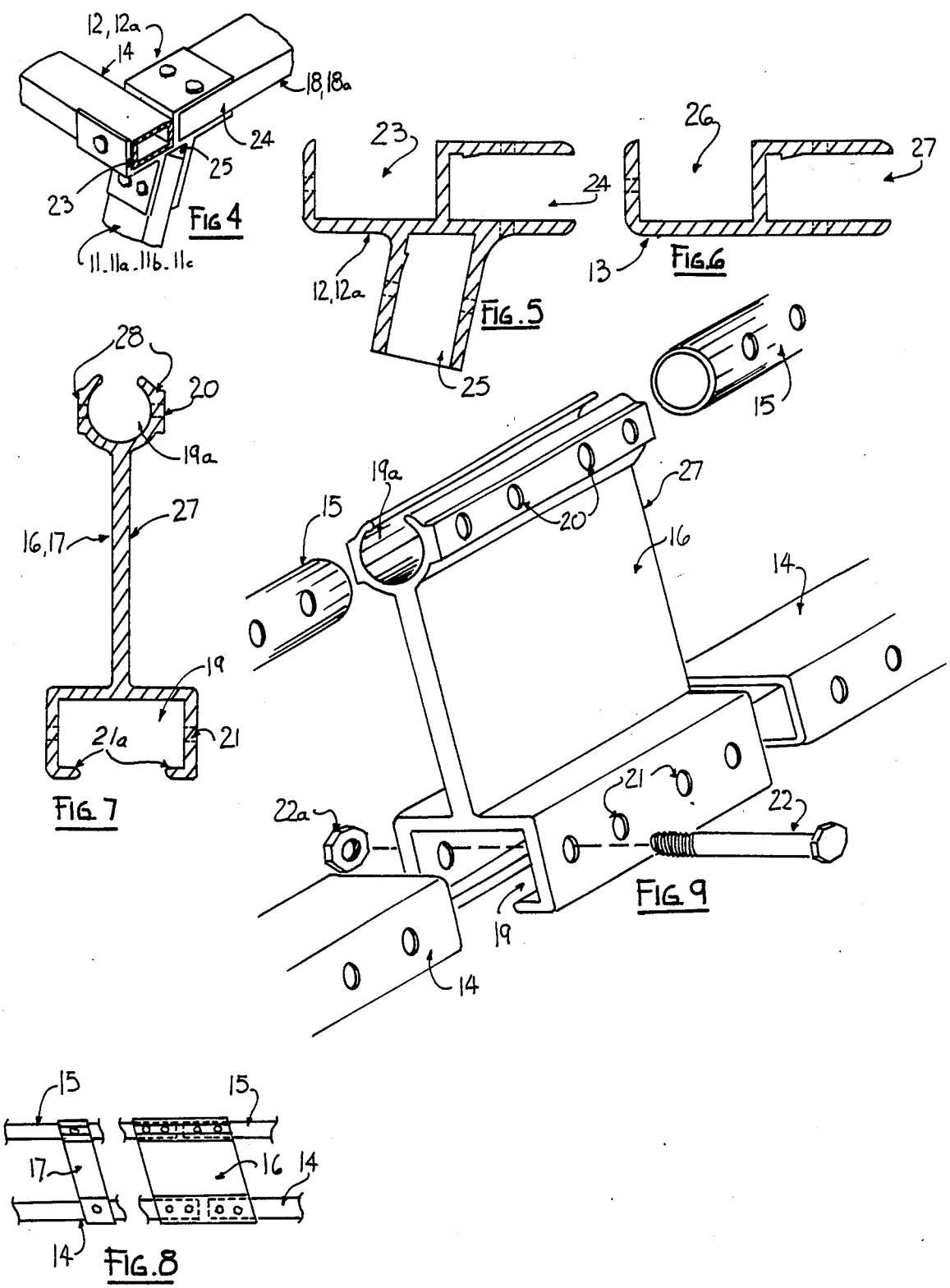

TRUCK RACK

BACKGROUND OF THE INVENTION

This invention relates to racks which are especially adapted to be mounted upon truck bodies and in particular, upon the bodies of pick-up trucks.

Such racks are frequently provided for mounting upon truck bodies for carrying various objects, in particular, elongated structural products such as lumber, pipe, etc., and articles of equipment such as ladders. Such racks are described in the prior art in various patents, including U.S. Pat. Nos. 4,138,046 and 4,509,787, among others. These racks of the prior art either fail to provide sufficient security or flexibility for carrying various types of objects or due to their heavy or elongated structure are difficult to ship and/or assemble.

SUMMARY OF THE INVENTION

In accordance with the present invention, a rack structure is provided which incorporates upper and lower rails which can then be packaged, shipped, and stored in sections and which can be easily assembled and mounted upon standards affixed to a truck bed by means of clamping and socket units as described further below.

The rack is supported on and attached to upright members or legs preferably attached inside of the truck bed or body at each of the four corners thereof. The uprights can be attached by bolting to the sides or at the truck bed by bolts or permanently by welding. The rack components are then attached to the upper ends of the legs by means of fittings designed to permit attachment by suitable fastening means such as bolts. The rack is formed of elongated longitudinal pairs of upper and lower side rails which are vertically spaced apart with one such pair supported by the vertical legs at each side of the truck body with the lower rails in engagement with said legs and with suitably spaced transverse cross braces which are attached to the same fittings which are attached to the leg uprights. The upper rails are spaced from and attached to the lower rails by means of spaced one piece fittings or brackets having openings designed to surround and conform to the cross-sectional shape of the rails and permit them to pass through the fittings and be tightly fastened by bolts or the like. The rails may be formed in two or more sections with each section to be joined end to end within one of the surrounding fittings as described below to facilitate storage and assembly of the components of the rack. In order to provide greater strength and rigidity of the assembled rack, the lower rails are preferably rectangular in cross section and tubular, while the upper rails may be cylindrical and tubular or rectangular tubular if desired.

BRIEF DESCRIPTION OF THE DRAWING

In the drawings:

FIG. 4 is a view in elevation of the means for supporting the lower rack components upon truck supports.

FIG. 5 is a vertical cross sectional view of the bracket utilized in the supporting means of FIG. 4.

FIG. 6 is a vertical cross sectional view of a bracket utlized in attaching a cross brace in the rack.

FIG. 7 is a view in vertical cross section of a bracket for supporting and spacing upper and lower rails of the rack.

FIG. 8 is a view in outline showing the manner in which sections of the rails are joined.

FIG. 9 is an enlarged view in perspective illustrating the assembly of rail sections with a central spacing bracket.

DESCRIPTION OF THE PREFERRED EMBODIMENTS

Figure 1:
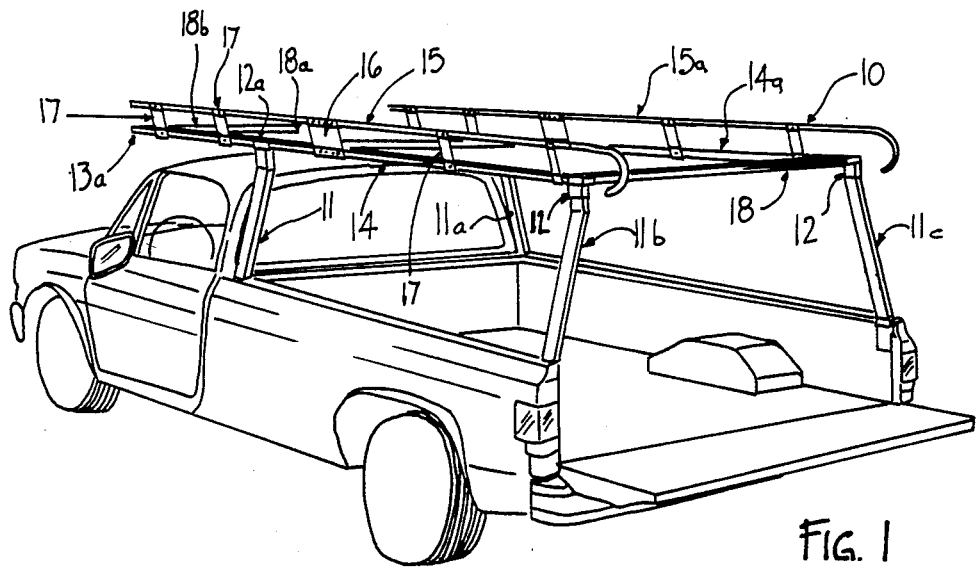
FIG. 1 is a view in perspective showing the rack of the invention mounted to a pick-up truck body.
Figure 3:
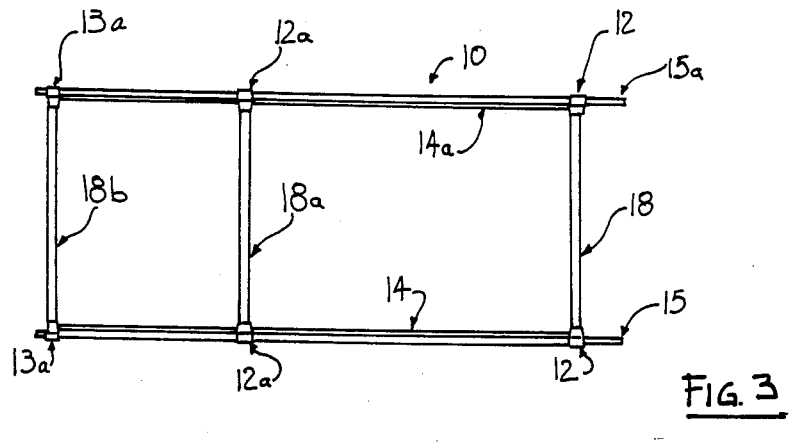
FIG. 3 is a top plan view of the rack assembly.
Figure 2:
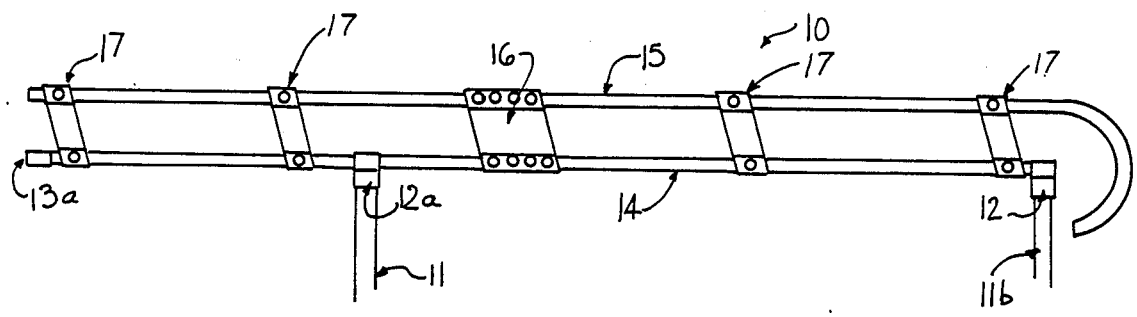
FIG. 2 is a view in perspective of one side of the rack.

As shown in FIGS. 1-3, the improved rack structure 10 is shown mounted upon vertical supports or stanchions 11, 11a, 11b and 11c which are bolted or welded or otherwise attached to the four corners of the truck body, or alternatively to the corners of the truck floor or bed, supported upon bracket members 12 and 12a which also engage the lower rails 14, 14a of the rack assembly which also includes upper rails 15, 15a which are vertically spaced from and supported upon the lower rails by means of brackets 16, 17 as described further below. Cross braces 18, 18 a and 18b are supported also by brackets 12, 12a and 13 as shown. The rear ends of the upper rails are shown as curved downward for ornamental purposes.

In FIGS. 4 and 5, bracket members 12, 12a utilized for supporting lower rails 14, 14a are in the form of unitary preformed members formed with a vertical or slightly angular downwardly open U shaped channel 25 which provides a socket which engages by bolts or otherwise the vertical supports 11, 11a, 11b, 11c on the truck body, and open U-shaped channels 23 and 24. The lower longitudinal rails 14 and 14a are positioned and held by one or more bolts within channel 23 and cross braces 18 and 18a are positioned within channel 24 also by bolts or otherwise as shown in greater detail in FIG. 4. Rails 14 are shown as tubular and rectangular in cross section which is preferred as providing a higher degree of strength and rigidity as a supporting structure for the rack, although cylindrical tubes or solid rods may also be used as desired and the channels of the supporting brackets described would be dimensioned to retain them in a close fitting manner as well as the rectangular tubes as shown.

Figure 10:
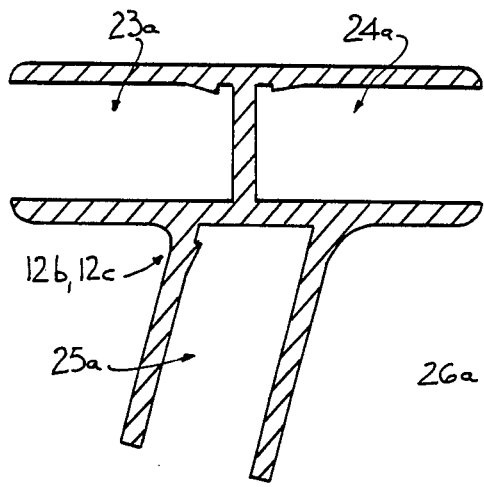
FIG. 10 is a view in vertical cross section of another form of bracket for mounting upon a stanchion.
Figure 11:
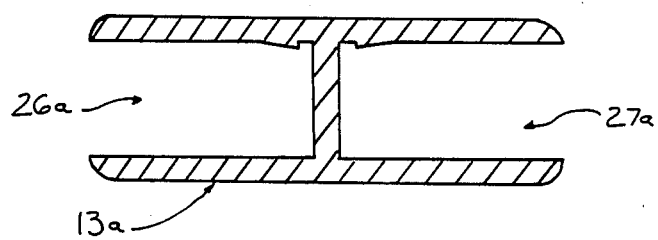
FIG. 11 is a view in vertical cross section of another form of bracket for supporting an intermediate cross brace.
Figure 12:
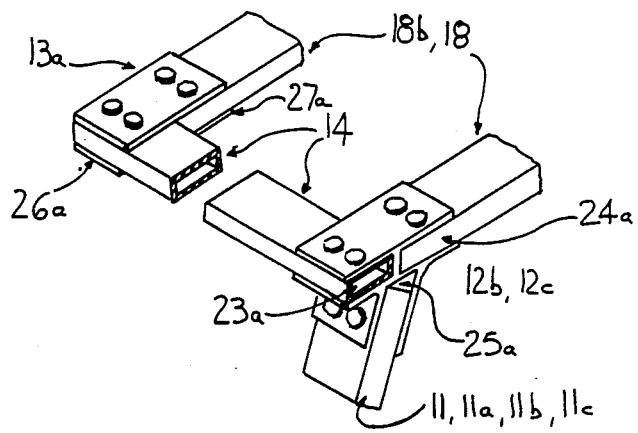
FIG. 12 is a view in elevation showing the brackets of figures 10 and 11 assembled to support the elongated rail and cross braces upon a stanchion.

As described Channel 23 is open at the top for the reception of rails 14, 14a channel 24 is open laterally to receive the cross braces 18, 18a, etc., while channel 25 is open at the bottom to receive the ends of the rack upright supports. While channel 23 is shown to be open at the top in order to receive the lower rail, it may, if desired, be open outwardly to receive the lower rail with the bolts then running vertically instead of horizontally as shown in FIGS. 10, 11, 12 described below.

As shown in FIG. 6, a bracket member 13 is shown having U shaped channels 26 abd 27 for attachment to the lower rails 14 and 14a in which the rails engage channel 26 and are attached by bolts or the like thereto and any cross brace which is intermediate to those attached to the stanchion brackets is supported within channel 27 as shown, for example, as a forward brace at 18b in FIGS. 1 and 3.

FIG. 7 shows the structure of the vertical upper rail supporting bracket 16, 17 which is in the form of a lower channel 19 open at the bottom shaped to receive the lower rails 14, 14a and an upper channel 19a open at the top to receive and enclose the upper rails 15 and 15a. Bolts holes as shown at 20 and 21 are provided to permit fastening of the rails by means of bolts inserted therethrough and through the rails. The open structure of the channels permits tight clamping engagement of the rails upon tightening of bolts. Channel 19 may be partially enclosed by inwardly extending segments 21a as shown to provide an essentially rectangular configuration to conform to the shape of the lower rails or, if desired, may be three sided and open at the bottom to provide a U-shaped channel to enclose the rails. The partial enclosure is preferably as it facilitates assembly by supporting the rails while they are bolted in place and also permits a slight degree of compression against the rail upon tightening of the bolts. Similarly, channel 19a is essentially cylindrical but open at the top to permit enclosing the cylindrical upper rail and allow tight clamping by tightening of the bolts.

The upper and lower channels are vertically spaced apart by a body member 27 having a width sufficient to provide the desired vertical spacing between the upper and lower rails. As shown at 28, the upper channel may be formed with reinforced flat areas to receive the bolts.

As shown in FIGS. 8 and 9, the rails may be assembled in two or more longitudinal sections and be joined end to end within the channels of bracket 16 which is of sufficient width to accommodate the ends to be joined and permit clamping by means of bolts which pass through the bracket and both ends. As illustrated, lower and upper rails 14 and 15 may be divided into two sections with the ends thereof engaged within bracket 16 as in FIG. 8 or shown as they are about to be assembled in FIG. 9 with bolts such as 22, 22a, through bolt holes 20, 21 as necessary.

Also as shown in FIG. 8, bracket 17 is structurally the same as 16 but of narrower width since it need not accommodate the ends of sections of the rails. Where the rails are not desired to be in sections, the narrower width brackets 17 may be used throughout.

An important advantage of the bracket structures described above is that each of the brackets 12, 13 and 16 may be formed of unitary extrusions which are complete in themselves and provide channels in which the rails and/or cross bracing members may be securely fastened.

From the standpoint of ease of assembly of the rack in sections, a typical rack may require an overall length of from 8-12 feet. By providing the intermediate brackets 16 of sufficient width to accommodate the ends of the segmented rails, the lower rails may be divided into two sections of 4-6 feet each and the upper rails which are generally somewhat longer may be divided into two sections which are each about the same or slightly longer. This permits packaging of the components in a manner which facilitates shipment and storage along with the required brackets and bolts. The rails themselves may be of any suitable diameter but by way of example, the lower rectangular tube rails may be about 1" in depth and about 2" in width, while the upper tube rails may be cylindrical and having an O.D. of about 1". The channels in the bracket would have correspondingly slightly greater dimensions to snugly fit the rails when placed therein. The upper and lower rails may be spaced apart vertically any desired distance and the bracket channels spaced apart accordingly. By way of example, in a typical rail assembly the upper and lower rails may be 5-6 inches apart on centers. The number and lateral spacing of the spacing brackets is a matter of choice but may be from 1½ to 3 ft. apart with an approximate 2 ft. spacing being preferred.

FIGS. 10 and 11 describe alternative brackte structures for supporting the lower rails and cross braces and their assembly upon the vertical stanchions is illustrated in FIG. 12. In FIG. 10 the bracket shown as 12b, 12c which is to be mounted upon the vertical supports or stanchions 11, 11a, 11b, 11c (FIGS. 11 and 12) is formed by extrusion to provide a pair of opposed horizontal channels 23a and 24a which are "U" shaped and open to receive the lower rails 14 and at the opposite side would receive the parallel rail 14a within channel 23a. These rails are bolted in place at their ends as illustrated in FIG. 12. The transverse cross brace 18 is bolted at each end within channel 24a (FIG. 12).

Brackets 12b and 12c, corresponding to brackets 12 and 12a shown in FIGS. 1, 3 and 4 are mounted upon the front and rear stanchions as desired in which the vertical channels 25a are bolted to the vertical supports. While channel 25 (FIG. 5) and channel 25a of FIG. 10 are shown as slightly angular to conform to the angular position of the vertical members, where such members are straight and completely vertical, these channels may also be vertical in order to properly support the rack in horizontal position. As shown in FIGS. 1 and 3, the rack and rail members extend beyond the stanchions over the cab of the truck. In order to provide lateral support at this point as described above, cross brace 18b (FIGS. 1, 3) is bolted within channel 27a of bracket 13a, and the front end of rail 14 is bolted within channel 26a, as shown in FIG. 12. Similarly, the rails and braces are mounted upon corresponding brackets at both sides of the rack as shown. While the channels of the respective lower brackets are described as shaped to receive rectangular cross sectioned rails and the brackets to support the upper rails to receive round tubular rails, they may, if desired, be shaped as open channels to receive rails of other cross sections so long as they may fit snugly within their open channels.

In view of the rails and brackets structure described above, it is apparent that the rack may be readily mounted and assembled upon the stanchions attached to the trunk bed which themselves may be permanently or temporarily attached. At the same time this permits easy disassembly when the rack is not required for use.

I claim:

1. A rack adapted to be mounted upon a truck body having a plurality of upright legs mounted thereon which comprises a pair of longitudinally spaced apart elongated side rail assemblies each of which comprises a lower rail and an upper rail vertically spaced from and supported by said lower rail, and cross braces extending between said lower rails from one side to the other, said lower and upper rails being spaced from each other by means of spacing brackets having vertically spaced open channels in which the respective rails are fastened, and a mounting bracket for each of the upright supporting legs comprising a downwardly open channel for engagement with the top of the leg, an open channel which encompasses and engages the lower rail and another open channel which encompasses and engages the end of a cross brace extending between said spaced apart lower rails, and wherein the said upper and lower rails are divided into two or more longitudinal segments, said segments being joined end to end within the corresponding channels of one of said spacing brackets.

2. A rack assembly adapted to be mounted upon a truck body which comprises an upright leg support mounted at its lower end adjacent to each corner of the truck body to provide spaced pairs of forward and rear leg supports, a rack supporting bracket affixed to the upper end of each of said legs in the form of a unitary preformed member having three open U-shaped channels one of which is downward U shaped channel engaging and affixed to said upper end, and the others are a pair of open U-shaped channels one of which is open outward or upward to receive a lower elongated rail and the other of which is open inward to receive a cross brace, said elongated lower rail fastened within its channel and extending from the bracket attached to each forward leg support to a similar bracket attached to each rear leg support and secured within said open rail receiving channel, and a transverse cross brace extending between each forward leg and between each rear leg the ends of each being secured within the cross brace receiving channels, and an elongated upper rail vertically spaced from and mounted upon each said lower rails by means of spacing brackets each of said brackets having a lower channel enclosing and secured to said lower rail and an upper channel enclosing and secured to said upper rail.

3. A rack assembly according to claim 2 wherein the rail assembly extends forward to the truck body and over the cab of the truck and wherein a cross brace extends between the lower rails affixed to brackets thereon in which the brackets comprise a pair of open U-shaped channels one of which opens outwardly and the other inwardly with the lower rails enclosed in said outward channels in said brackets and said cross brace extends between and has its ends enclosed by said inwardly extending channels.

4. A rack assembly according to claim 3 wherein the upper and lower rails are each divided at an intermediate point into two segments which are joined together end to end within the channels of a spacing bracket at an intermediate point in the assembly.

* * * * *